US006705854B2

(12) United States Patent
Kashiyama

(10) Patent No.: US 6,705,854 B2
(45) Date of Patent: Mar. 16, 2004

(54) REAR HOLDER-ATTACHED CONNECTOR AND METHOD OF PRODUCING THE SAME

(75) Inventor: Motohisa Kashiyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/138,658

(22) Filed: May 6, 2002

(65) Prior Publication Data

US 2002/0127921 A1 Sep. 12, 2002

Related U.S. Application Data

(62) Division of application No. 09/642,669, filed on Aug. 22, 2000, now Pat. No. 6,575,795.

(30) Foreign Application Priority Data

Aug. 24, 1999 (JP) ........................................ P.11-237262

(51) Int. Cl.[7] ................................................ B29C 45/44

(52) U.S. Cl. ....................... 425/556; 264/318; 264/334; 425/572; 425/573; 425/577; 425/DIG. 58

(58) Field of Search ................................ 425/556, 577, 425/DIG. 58, 572, 588, 573; 264/334, 318

(56) References Cited

U.S. PATENT DOCUMENTS

| | | | | |
|---|---|---|---|---|
| 4,403,933 A | * | 9/1983 | Davis et al. | 425/573 |
| 4,787,860 A | | 11/1988 | Bender | |
| 5,501,619 A | | 3/1996 | Sakatani et al. | |
| 5,613,881 A | | 3/1997 | Ichida et al. | |
| 5,647,777 A | | 7/1997 | Sasai et al. | |
| 5,814,356 A | * | 9/1998 | Ito et al. | 425/556 |
| 5,897,402 A | | 4/1999 | Sasai et al. | |
| 5,980,333 A | | 11/1999 | Nakamura et al. | |
| 6,106,340 A | | 8/2000 | Myer et al. | |
| 6,200,172 B1 | | 3/2001 | Konoya et al. | |

FOREIGN PATENT DOCUMENTS

| | | |
|---|---|---|
| EP | 0 732 772 A2 | 9/1996 |
| EP | 0 822 616 A2 | 2/1998 |
| EP | 0 851 535 A2 | 7/1998 |
| JP | 8-315896 | 11/1996 |

* cited by examiner

*Primary Examiner*—Tim Heitbrink
(74) *Attorney, Agent, or Firm*—Sughrue Mion, PLLC

(57) ABSTRACT

In a rear holder-attached connector (1), a relatively-thick protective rib (10) with a width (B) projects outwardly from opposite sides of a housing (2), and is disposed between upper and lower terminal receiving chambers (3). This width (B) is larger than a width of rear holders (20*a*, 20*b*), and this rib (10) protects the rear holders (20*a*, 20*b*) so that these rear holders, provisionally retained on the housing (2) within a metal-mold assembly, will not be discharged from the metal-mold assembly to drop, and will not be disengaged from the housing even upon contact with another housing. The provision of the protective rib (10) also serves to provide a good flow of a resin poured from the rear side of the housing (2) during the molding operation, and therefore thin partition walls, forming the terminal receiving chambers (3), can be positively molded, thereby enhancing the yield of the molded housings.

20 Claims, 10 Drawing Sheets

REAR HOLDER-ATTACHED CONNECTOR AND METHOD OF PRODUCING THE SAME

This is a divisional of application No. 09/642,699 filed Aug. 22, 2000 now U.S. Pat. No. 6,575,795, the disclosure of which is incorporated herein by reference.

BACKGROUND OF THE INVENTION

1. Field of the Invention

The present invention relates to a connector with a rear holder and a method of producing the connector, in which a housing and the rear holder are molded in a plurality of metal-molds, and thereafter the rear holder is provisionally retained on the housing by moving the metal-molds, and the rear holder can be completely retained after the insertion of connection terminals.

The present application is based on Japanese Patent Application No. Hei. 11-237262, which is incorporated herein by reference.

2. Description of the Related Art

There are known various examples of a rear holder-attached connector and a methods of producing the same, and such one example is disclosed in Unexamined Japanese Patent Publication No. Hei. 8-315896.

In a conventional rear holder-attached connector 51 shown in FIGS. 10 to 14, a rear holder 70, movable between a provisionally-retained position and a completely-retained position, is provided on a housing 52 in a straddling manner, and is held in the provisionally-retained position, the housing 52 having a plurality of terminal receiving chambers 53. Connection terminals 80 are inserted respectively into the terminal receiving chambers 53 from the rear side of the housing 52, and are retained respectively by housing lances 81 provided respectively within the terminal receiving chambers 53. Then, the rear holder 70 is held in the completely-retained position, thereby retaining the connection terminals 80 in a double manner.

More specifically, a forwardly downwardly-slanting, retaining hole or slot 72 is formed through each of opposite side walls 71 of the rear holder 70, and secondary retaining projections 73 for respectively retaining the connection terminals 80 in a secondary manner are formed on a lower surface of the rear holder 70 at a front end portion thereof. An upper side of each terminal receiving chamber 53 is open as at 53*a* at a central portion thereof, and the secondary retaining projection 73 is inserted obliquely downwardly into the terminal receiving chamber 53 through this opening 53*a* when the rear holder is moved from the provisionally-retained position to the completely-retained position. Forwardly downwardly-slanting, provisionally-retaining projections 54 are formed respectively on opposite side surfaces 52*a* of the housing 52, and also forwardly downwardly-slanting, completely-retaining projections 55 are formed respectively on the opposite side surfaces 52*a*, and are disposed obliquely forwardly of the provisionally-retaining projections 54, respectively. The projections 54, as well as the projections 55, are engageable in the retaining holes 72, respectively.

In the rear holder-attached connector of the above construction, when the rear holder 70 is pressed or pushed from a position above the rear end portion of the housing 52, the retaining holes 72 are retainingly fitted respectively on the provisionally-retaining projections 54, so that the rear holder 70 is held in the provisionally-retained position relative to the housing 52. Then, the connection terminals 80, each connected to a sheathed wire W, are inserted respectively into the terminal receiving chambers 53 from the rear side, and are primarily retained by the housing lances 81, respectively.

Then, when the rear holder 70 is pressed forwardly obliquely downwardly, the side walls 71 are elastically deformed laterally, so that each retaining hole 72 is disengaged from the provisionally-retaining projection 54, and advances obliquely forwardly, and a front end of each side wall 71 slides over the completely-retaining projection 55. Then, the retaining holes 72 are retainingly fitted on the completely-retaining projections 55, respectively, and at the same time the secondary retaining projections 73 are inserted respectively into the terminal receiving chambers 53 through the respective openings 53*a* to secondarily retain the connection terminals 80, respectively.

In the case where the housing 52 and the rear holder 70 are molded separately from each other, and then are brought to an assembling site where the housing and the rear holder are assembled together, the conveyance to the assembling side, the assembling step and an examination step are required, and besides a stock control for each of the housing 52 and the rear holder 70 is necessary.

To improve this, there has been proposed a rear holder-attached connector in which a rear holder 70 and a housing 52 are molded by a metal-mold assembly shown in FIG. 14, and also the rear holder 70 is attached to the housing 52 in a provisionally-retained condition, and then the two are removed from the metal-mold assembly.

The provisionally-retaining metal-mold assembly 90, shown in FIG. 14, comprises a fixed metal-mold 91, a first movable metal-mold 92 capable of moving upward and downward, and a pair of second movable metal-molds 93 and 93 capable of moving right and left. The housing 52 is molded by the fixed metal-mold 91, the first movable metal-mold 92 and inner sides of the second movable metal-molds 93 and 93. The rear holder 70 is molded by the fixed metal-mold 91, an outer side of the first movable metal-mold 92 and the inner sides of the second movable metal-molds 93 and 93.

First, the housing 52 and the rear holder 70 are molded by all of the metal-molds combined together, and then the first movable metal-mold 92 is moved downward, and then the second movable metal-molds 93 and 93 are moved right and left, respectively, that is, away from each other. As a result, the rear holder 70 and the housing 52 are molded, with the formed provisionally retained on the latter, and when the first movable metal-mold 92 is moved downward, the housing 52 and the rear holder 70 are discharged from the provisionally-retaining metal-mold assembly 90.

In the conventional rear holder-attached connector 51, however, the retaining holes 72 are retainingly engaged with provisionally-retaining projections 54 to hold the rear holder 70 on the housing 52 in the provisionally-retained condition, and also the retaining holes 72 are retainingly engaged with the completely-retaining projections 55 to hold the rear holder 70 on the housing 52 in the completely-retained condition. Therefore, in order that the rear holder will not move or shake relative to the housing in either of the two retained conditions, high dimensional accuracies are required, and this has invited problems that the productivity is lowered and that the cost increases.

And besides, with the provisionally-retaining metal-mold 90, the housing 52 and the rear holder 70 are molded in such a manner that the rear holder 70 is held on the housing 50 in the provisionally-retained condition. Therefore, it is necessary to provide a gap G1 between the inner surface of each side wall 71 of the rear holder 70 and the corresponding side surface of the housing 52, and also it is necessary to provide a gap G2 between the upper surface of the housing 52 and the lower surface of each secondary retaining projection 73 on the rear holder 70, as shown in FIG. 13.

Therefore, as shown in FIG. 14, a thin plate-like partition plate portion 94 for forming the gap G2 is formed on the fixed metal-mold 91, and thin plate-like partition wall portions 95 for respectively forming the gaps G1 are formed on the fixed metal-mold 91, and partition wall portions 96 are formed on the first movable metal-mold 92. And besides, a thin mold portion needs to be provided between the outer periphery of each provisionally-retaining projection 54 and the inner peripheral edge of the corresponding retaining hole 72. The metal-molds have such thin plate portions, and this has invited a problem that the durability of the metal-molds is lowered.

SUMMARY OF THE INVENTION

With the above problems in view, it is an object of the present invention to provide a rear holder-attached connector in which high dimensional accuracy is not required for the molding operation, and a high yield is achieved, and the cost is low, and the durability of metal-molds is high.

To achieve the above object, according to the first aspect of the present invention, there is provided a connector which comprises a housing having a terminal receiving chamber into which a connection terminal is insertable, a rear holder attachable to the housing, the rear holder being operative to be held on the housing in one of a provisionally-retained condition and a completely-retained condition, wherein when the rear holder is provisionally retained on the housing, the connection terminal is insertable in the terminal receiving chamber, and when the rear holder is completely retained on the housing, the connection terminal is retained by the rear holder in the terminal receiving chamber, and a protective rib formed on the housing, the protective rib having portions outwardly projected from opposite side surfaces of the housing, wherein a distance between outer end surfaces of the portions of the protective rib is larger than a width of the rear holder.

In the connector of the aforementioned construction, since there is provided the protective rib which is larger in width than the rear holder, a molten resin can flow satisfactorily even when the terminal receiving chambers have thin walls, and therefore the yield is enhanced. As a result, the productivity is enhanced, and the cost is reduced.

According to a second aspect of the present invention, it is preferable that the rear holder includes opposite side walls having retaining holes which are respectively formed in inner surfaces thereof, and retaining pawls respectively form on the inner surfaces and having forwardly downwardly-slanting surfaces, wherein the housing has provisionally-retaining projections respectively formed on the opposite side surfaces of the housing at a rear end portion thereof and respectively engaged in the retaining holes of the rear holder when the rear holder is provisionally retained on the housing, the provisionally retaining projections each having a plurality of tapering surfaces, tapering retaining steps formed on the housing and are disposed respectively adjacent to the provisionally-retaining projections, the tapering retaining steps are respectively engaged with the retaining pawls, and a forwardly downwardly-slanting abutment surface for guiding the rear holder is formed on an upper surface of the housing at the rear end portion thereof. Accordingly, the rear holder is held in the provisionally-retained position and the completely-retained position through the abutting engagement of the retaining pawls with the respective retaining steps and also through the abutting engagement of the inner surface (reverse surface) of the rear holder with the abutment surface. Namely, the movement of the rear holder for retaining purposes is effected through the relative wide surfaces, and therefore high dimensional accuracy is not required.

According to the third aspect of the present invention, it is preferable to provide a provisionally-retaining metal-mold assembly for molding the connector recited in the aforementioned first aspect of the present invention. Preferably, the provisionally-retaining metal-mold assembly comprises a pouring gate communicating with a plurality of gates which branch off from the pouring gate, a fixed metal-mold having at least one central gate among the plurality of gates being disposed in substantially parallel to the terminal receiving chamber, and a plurality of movable metal-molds movable relative to the fixed metal-mold, wherein the central gate of the fixed metal-mold communicates with a mold cavity portion formed by at least one of the movable metal-molds for molding the protective rib.

In the provisionally-retaining metal-mold assembly, the molten resin, poured through the central gate, flows through the mold cavity portion of the movable metal-mold for molding the relatively-wide protective rib, and then flows into relatively-narrow mold cavity portions for molding walls forming the terminal receiving chambers in the housing. Accordingly, the molten resin positively flows even into the narrow mold cavity portions, and the yield of the molded housings is enhanced, and the productivity is enhanced, and the cost is reduced.

Furthermore, to achieve the above object, according to the fourth aspect of the present invention, it is preferable to provide a method of producing a connector which includes a housing having a terminal receiving chamber into which a connection terminal is insertable, and a rear holder attachable to the housing, the rear holder being operative to be held on the housing in one of a provisionally-retained condition and a completely-retained condition, wherein when the rear holder is provisionally retained on the housing, the connection terminal is insertable in the terminal receiving chamber, and when the rear holder is completely retained on the housing, the connection terminal is retained by the rear holder in the terminal receiving chamber. Preferably, the method comprises forming a protective rib on the housing to have a distance between outer end surfaces thereof larger than a width of the rear holder, through a provisionally-retaining metal-mold assembly for molding the housing and the rear holder, wherein the provisionally-retaining metal-mold comprises a pouring gate and a plurality of gates branching off from the pouring gate, and includes a fixed metal-mold having at least one central gate among the plurality of gates being disposed in substantially parallel to the terminal receiving chamber, and a plurality of movable metal-molds movable relative to the fixed metal-mold, wherein the central gate of the fixed metal-mold communicates with a mold cavity portion formed by at least one of the movable metal-molds for molding the protective rib.

DETAILED DESCRIPTION OF THE PREFERRED EMBODIMENT

One preferred embodiment of a rear holder-attached connector of the present invention will now be described in detail with reference to FIGS. 1 to 9.

Figure 1:
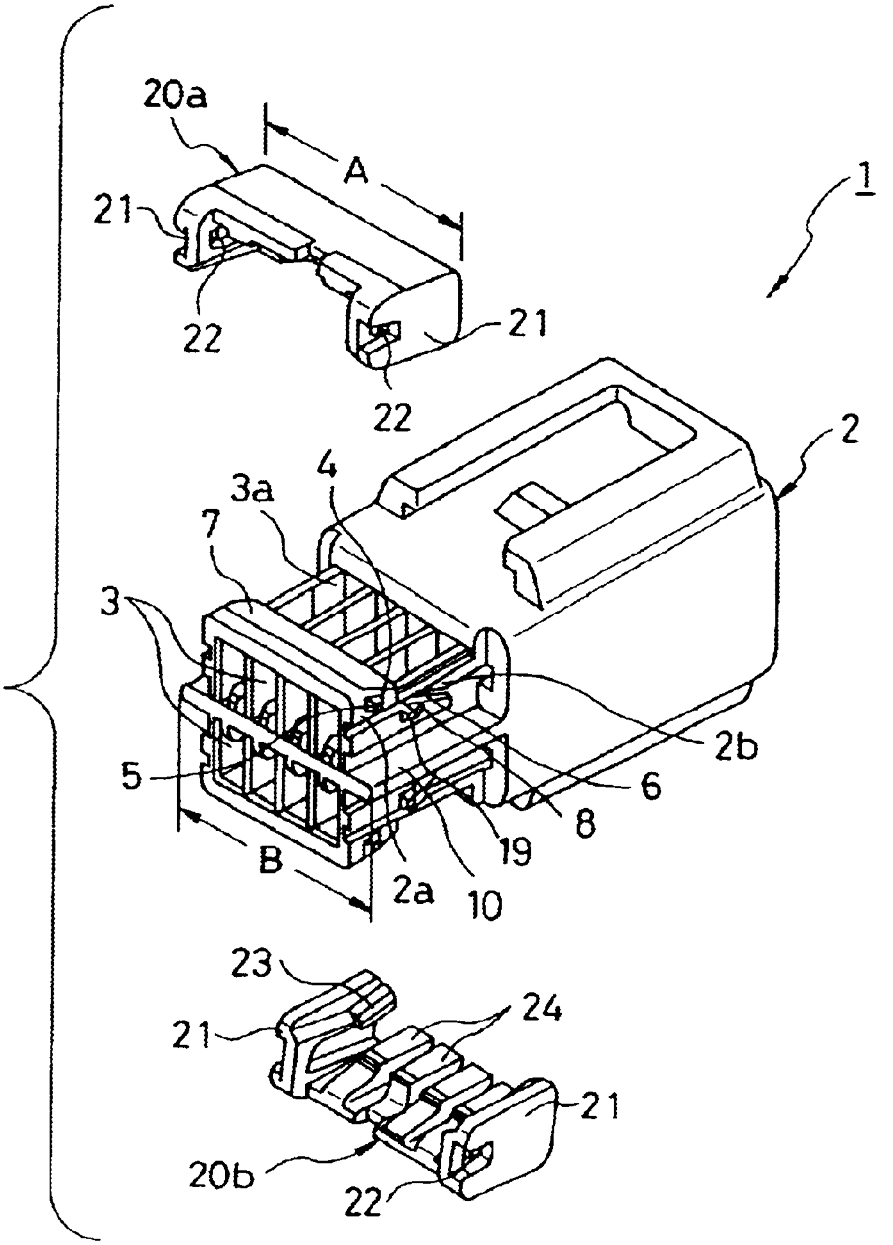
FIG. 1 is an exploded, perspective view of one embodiment of a rear holder-attached connector of the present invention.
Figure 2:
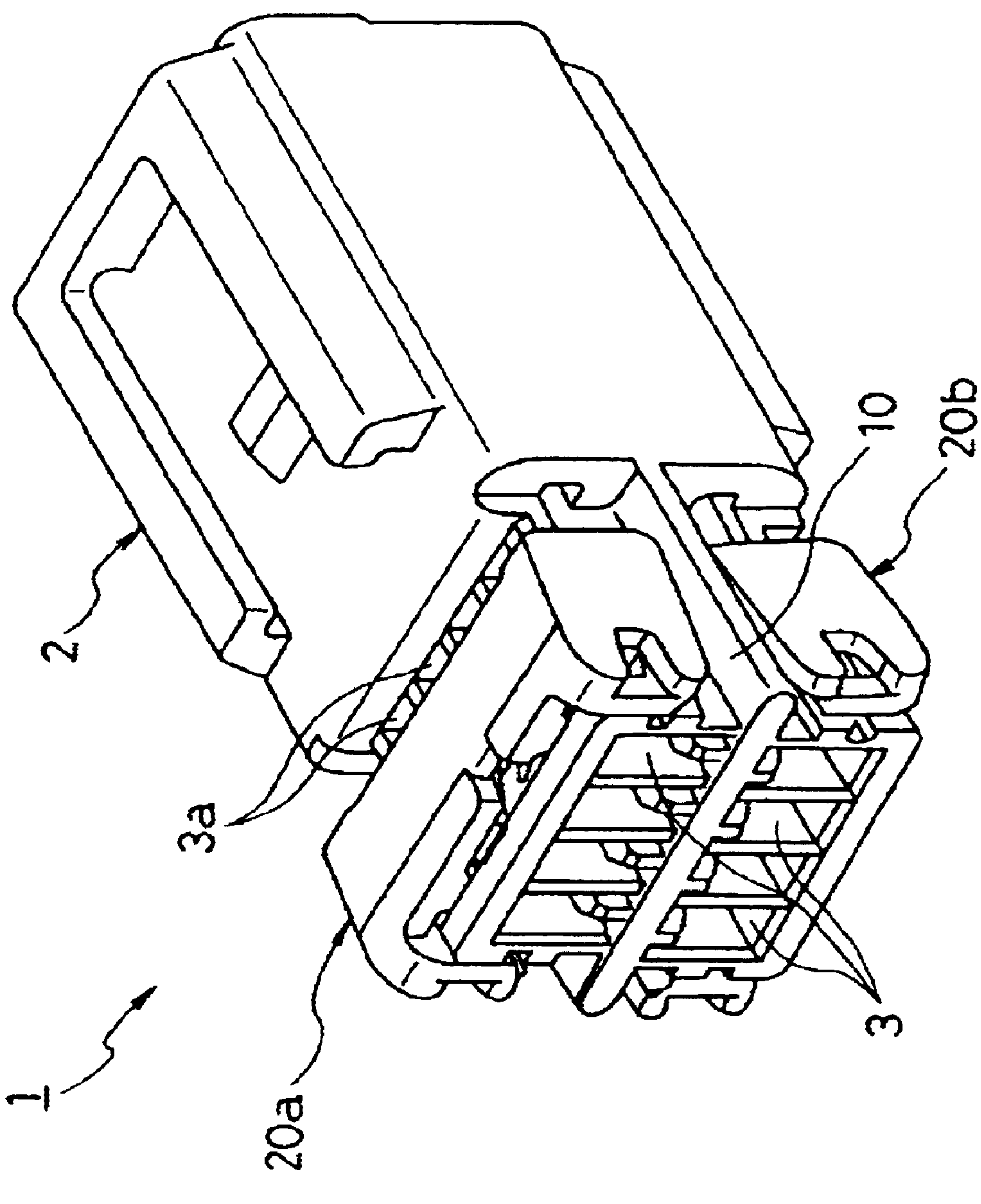
FIG. 2 is a perspective view of the connector of FIG. 1, having rear holders held in their respective provisionally-retained positions.

The rear holder-attached connector of the present invention will now be described with reference to FIGS. 1 to 6. As shown in FIG. 1, the rear holder-attached connector 1 of this embodiment comprises the housing 2 of the female type, having a plurality of terminal receiving chambers 3, and the pair of rear holders 20*a* and 20*b* each provided on the housing 2 in a straddling manner in a provisionally-retained condition and in a completely-retained condition. As shown in FIGS. 2 and 5, in the provisionally-retained condition of the rear holders 20*a* and 20*b*, connection terminals 30 are inserted respectively into the terminal receiving chambers 3 from the rear side, and are retained respectively by housing lances 31 provided respectively within the terminal receiving chambers 3. Then, when the rear holders 20*a* and 20*b* are moved into their respective completely-retained positions, secondary retaining projections 24, formed on an inner surface (reverse surface) of each rear holder 20*a*, 20*b* enter the respective terminal receiving chambers 3 through respective openings 3*a* (see FIG. 5), thereby retaining the connection terminals 30 in a double manner.

Figure 3:
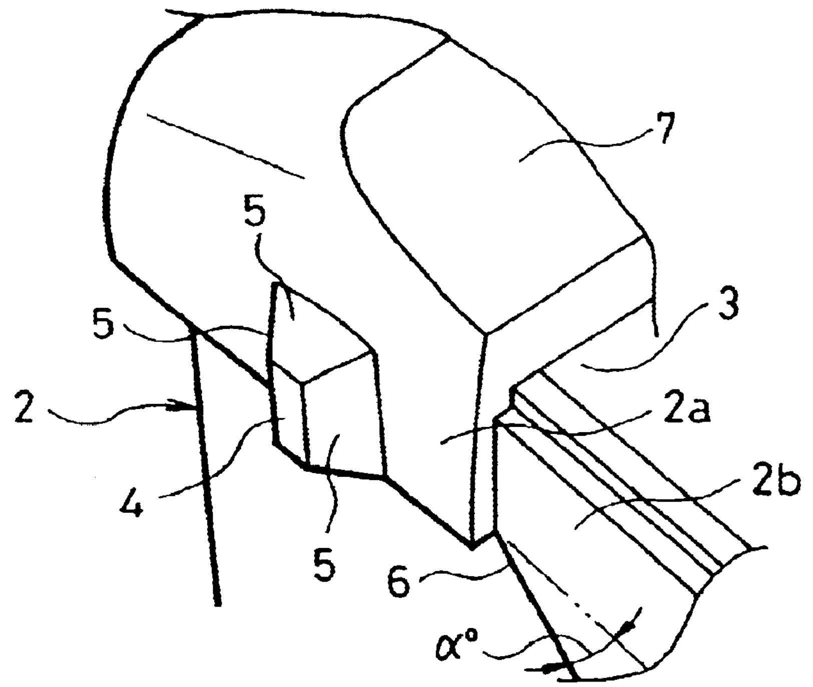
FIG. 3 is an enlarged perspective view of a portion of a housing of FIG. 1 including a provisionally-retaining projection.
Figure 4:
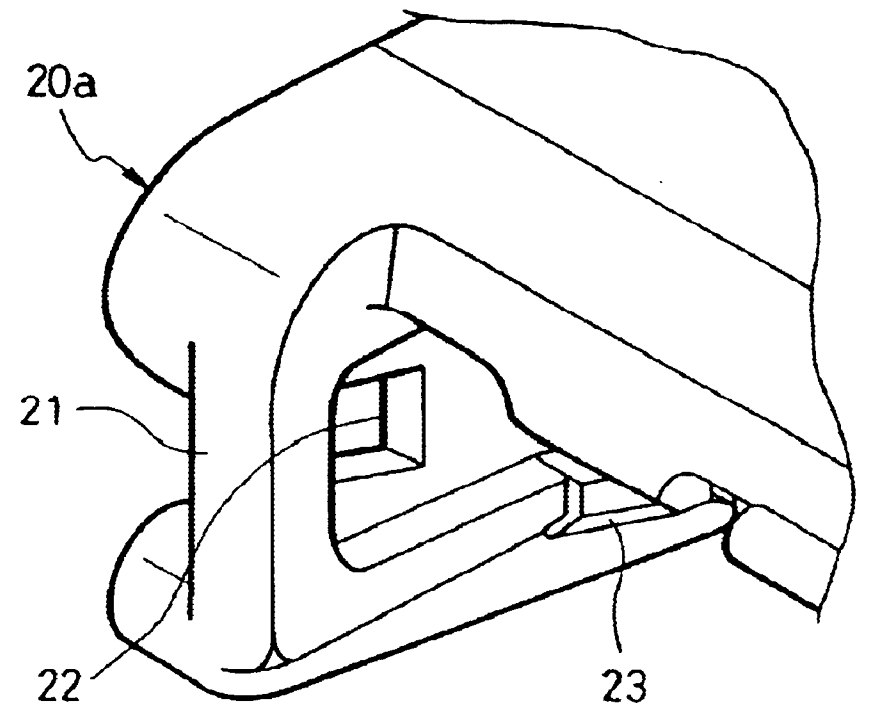
FIG. 4 is an enlarged perspective view of a portion of the rear holder of FIG. 1 including a side wall thereof.
Figure 5:
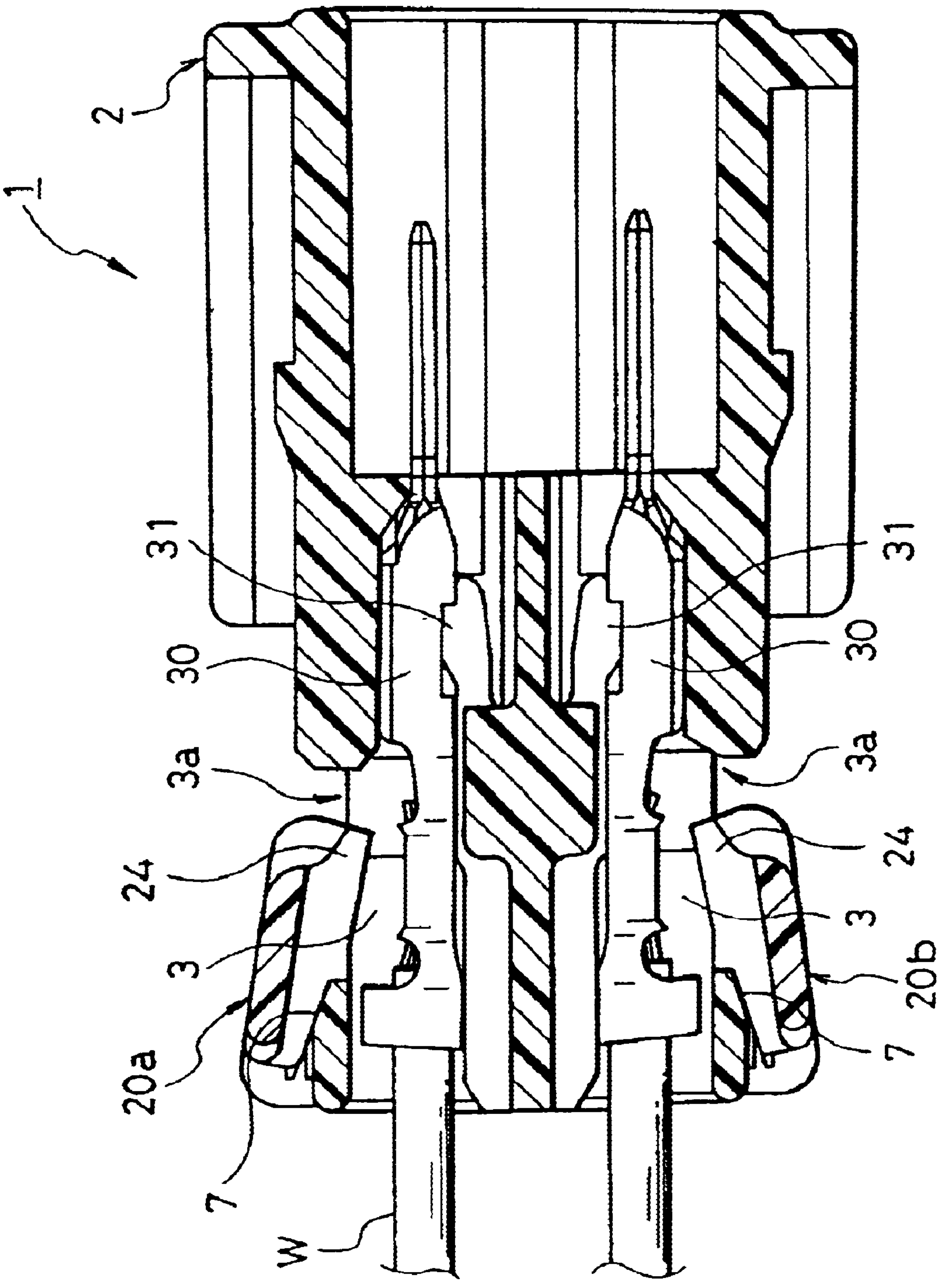
FIG. 5 is a vertical cross-sectional view of the connector of FIG. 1, showing the rear holders held in their respective provisionally-retained positions.

More specifically, as shown in FIGS. 3 and 4, a retaining hole 22 is formed in an inner surface of each of opposite side walls 21 of the rear holder 20*a* (20*b*), and a retaining pawl 23, having a forwardly downwardly-slanting surface, is formed on this inner surface, and provisionally-retaining projections 4 for being engaged respectively in the retaining holes 22 are formed on opposite side surfaces 2*a* of a rear end portion of the housing 2, tapering surfaces 5 being formed on each provisionally-retaining projection 4 over the entire periphery thereof. A tapering retaining step 6 for engagement with the retaining pawl 23 is formed on a side surface 2*b* of a rear portion of the housing extending from each side surface 2*a*, the retaining step 6 being slanting forwardly downwardly at an angle $\alpha$ with respect to a horizontal plane.

A forwardly downwardly-slanting abutment surface 7 of a large width for contact with the inner surface of the rear holder 20*a* (20*b*) so as to guide the same is formed on an upper (lower) surface of the rear end portion of the housing 2. As shown in FIG. 1, a guide rail 8 is formed adjacent to each retaining step 6 in parallel relation thereto, and a completely-retaining projection 19 is formed on a side surface of this guide rail 8.

In the rear holder-attached connector 1 of this embodiment, a relatively-thick protective rib 10 is formed on the housing 2 at the boundary between the upper and lower rows of terminal receiving chambers 3, and projects outwardly from the opposite side surfaces of the housing 2. A width B of the protective rib 10 is larger than the width A of the rear holder 20*a*, 20*b*, and the protective rib 10 protects the rear holders 20*a* and 20*b* so that these rear holders, provisionally retained on the housing 2 within the metal-mold assembly, will not be discharged from the metal-mold assembly to drop, and will not be disengaged from the housing even upon contact with another housing. The formation of the protective rib 10 also serves to provide a good flow of a resin poured from the rear side of the housing 2 during the molding operation, and therefore thin partition walls, forming the terminal receiving chambers 3, can be positively molded, thereby enhancing the yield of the molded housings.

In the rear holder-attached connector 1 of the above construction, when the rear holders 20*a* and 20*b* are pressed against the rear portion of the housing 2 molded within the provisionally-retaining metal-mold assembly as shown in FIGS. 1 to 5, the retaining holes 22 are first engaged with the provisionally-retaining projections 4, respectively. As a result, each of the rear holders 20*a* and 20*b* is pivotally moved or tilted forwardly about the provisionally-retaining projections 4, so that the retaining pawls 23 are engaged with the retaining steps 6, respectively, and also the inner surfaces of the rear holders 20*a* and 20*b* are abutted against the abutment surfaces 7, respectively, and therefore the rear holders 20*a* and 20*b* are held on the housing 2 in the provisionally-retained condition.

Figure 6:
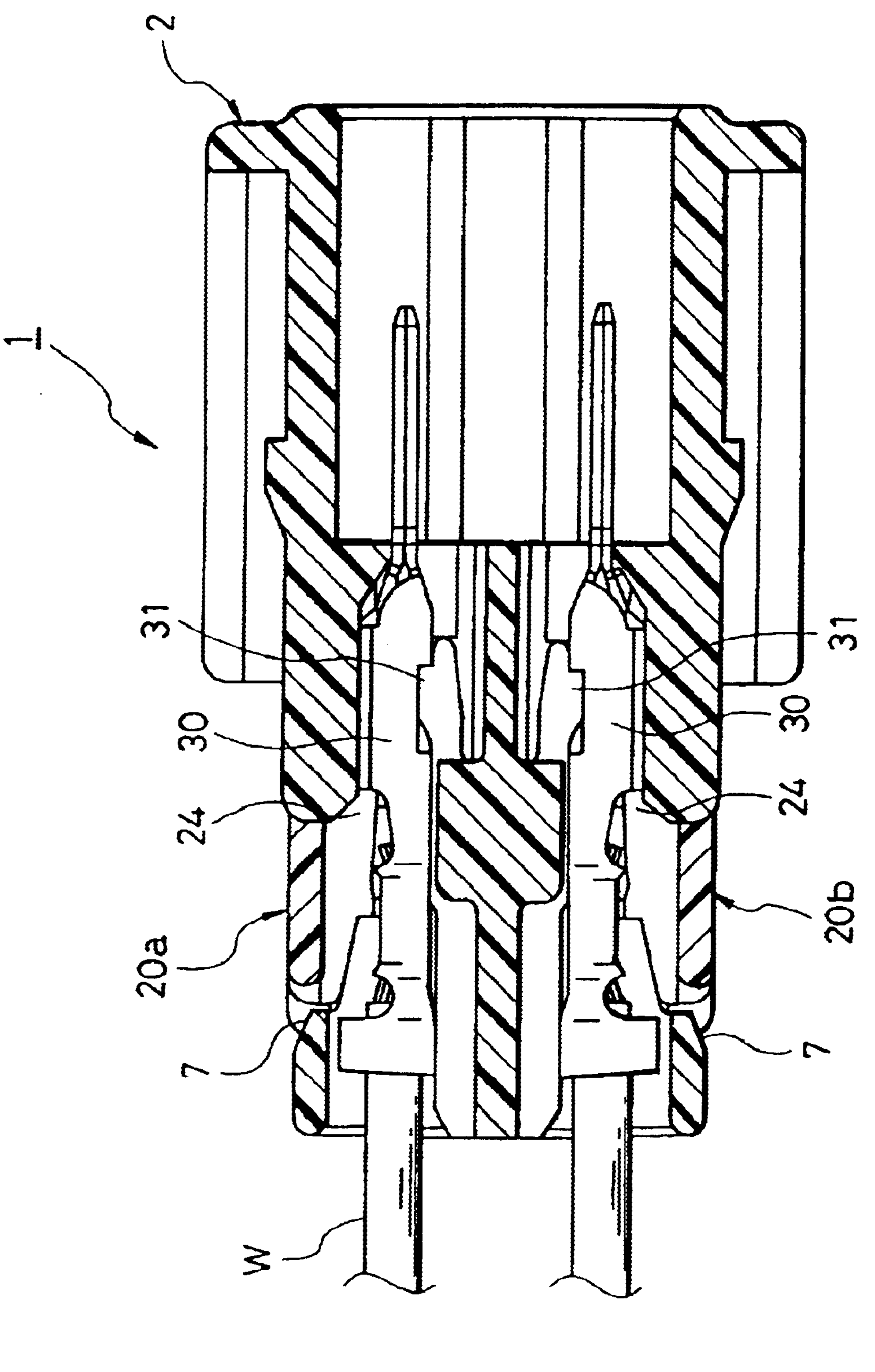
FIG. 6 is a vertical cross-sectional view of the connector, showing a condition in which the rear holders of FIG. 5 are held in their respective completely-retained positions.

Then, as shown in FIGS. 1 to 5, the connection terminals 30, each connected to a sheathed wire W, are inserted respectively into the terminal receiving chambers 30 from the rear side, and then when the rear holders 20*a* and 20*b* are pushed forward, the retaining pawls 23 are guided by the retaining steps 6, respectively. The rear holder 20*a* (20*b*) advances forwardly downwardly while the inner surface thereof is guided by the abutment surface 7, and the retaining holes 22 are retainingly engaged with the completely-retaining projections 19, respectively. At this time, the secondary retaining projections 24, formed on each of the rear holders 20*a* and 20*b*, are inserted respectively into the associated terminal receiving chambers 3 through the respective openings 3*a*, thereby retaining the connection terminals 30 in a double manner, as shown in FIG. 6.

In the rear holder-attached connector 1 of the above construction, the retaining hole 22 is formed in the inner surface of each of the opposite side walls 21 of the rear holder 20*a* (20*b*), and the retaining pawl 23, having the forwardly downwardly-slanting surface, is formed on this inner surface. The provisionally-retaining projections 4 for being engaged respectively in the retaining holes 22 are formed on the opposite side surfaces 2*a* of the rear end portion of the housing 2, the tapering surfaces 5 being formed on each provisionally-retaining projection 4 over the entire periphery thereof. The tapering retaining step 6 for engagement with the retaining pawl 23 is formed on the side surface 2*b* of the rear portion of the housing extending from each side surface 2*a*.

Further, the forwardly downwardly-slanting abutment surface 7 for contact with the inner surface of the rear holder 20*a* (20*b*) so as to guide the same is formed on the upper (lower) surface of the rear end portion of the housing 2. The relatively-thick protective rib 10 is formed on the housing 2 at the boundary between the upper and lower rows of terminal receiving chambers 3, and projects outwardly from the opposite side surfaces of the housing 2, and the width B of the protective rib 10 is larger than the width A of the rear holder 20*a*, 20*b*.

Therefore, the rear holder 20*a*, 20*b* is held in the provisionally-retained position and the completely-retained position through the abutting engagement of the retaining pawls 23 with the respective retaining steps 6 and also through the abutting engagement of the inner surface (reverse surface) of the rear holder 20*a*, 20*b* with the abutment surface 7. Namely, the movement of the rear holder for retaining purposes is effected through the relative wide surfaces, and therefore high dimensional accuracy is not required. And besides, because of the provision of the protective rib 10, the molten resin can be positively filled in those mold cavity portions for molding the thin partition walls, forming the plurality of terminal receiving chambers 3, so that the yield can be enhanced. Therefore, the productivity is enhanced, and the cost is reduced.

Figure 7:
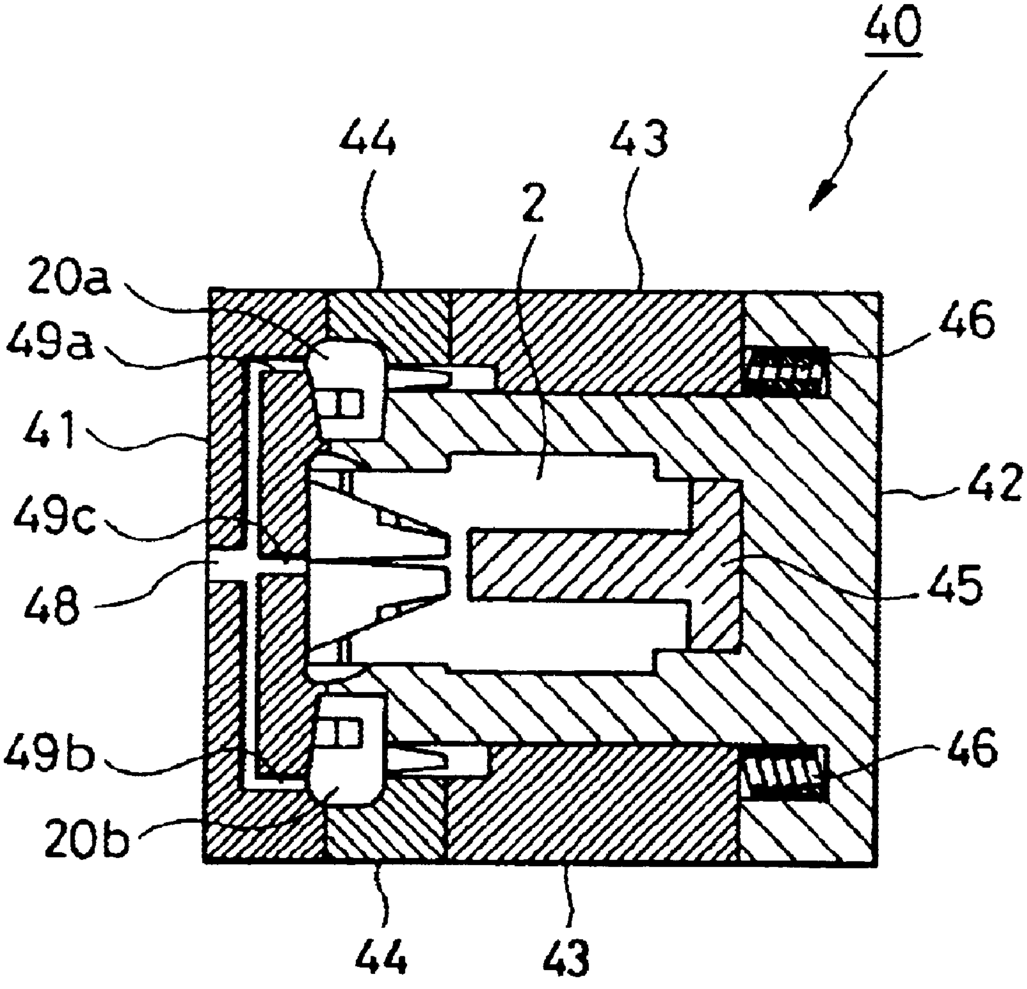
FIG. 7 is a vertical cross-sectional view of a provisionally-retaining metal-mold assembly for molding the rear holder-attached connector of FIG. 1, showing a condition during an injection molding operation.

Next, a method of producing the rear holder-attached connector 1 of the present invention will be described with reference to FIGS. 7 to 9. As shown in FIG. 7, the provisionally-retaining metal-mold assembly 40 for molding the housing 2 and the rear holders 20*a* and 20*b* comprises a fixed metal-mold 41 having gates 49*a*, 49*b* and 49*c* branching off from a pouring gate 48, and a plurality of movable metal-molds 42 to 45 axially movable relative to the fixed metal-mold 41.

The first movable metal-mold 42 forms the outer side of the housing 2 and the inner sides of the rear holders 20*a* and 20*b*, and the second movable metal-mold 43 supporting the first movable metal-mold 42 in a manner to allow an axial movement thereof, third movable metal-molds 44 movably supported on the second movable metal-mold 43 so as to form the outer sides of the rear holders 20*a* and 20*b*, and the fourth movable metal-mold 45 for forming a central portion of the housing 2 and for supporting the molded housing 2. Compression springs 46 are provided between the first movable metal-mold 42 and the second movable metal-mold 43, and the first movable metal-mold 42 can be moved a distance D away from the second movable metal-mold 43 under the influence of the compression springs 46, as shown in FIG. 8.

The fixed metal-mold 41 and the movable metal-molds 42 to 45 are combined together as shown in FIG. 7, and in this condition the housing 2 and the rear holders 20*a* and 20*b* are molded. At this time, the molten resin is poured into the gates 49*a*, 49*b* and 49*c* branching off from the pouring gate 48 in the fixed metal-mold 41. More specifically, the two rear holders 20*a* and 20*b* are molded through the gates 49*a* and 49*b*, respectively, while the housing 2 is molded through the central gate 49*c*.

The central gate 49*c* communicates with a mold cavity portion of the movable metal-mold 42 for molding the protective rib 10 (FIG. 1) projecting from the opposite side surfaces of the housing 2 in parallel relation to the terminal receiving chambers 3, and this mold cavity portion communicates with other mold cavity portions for molding the partition walls forming the terminal receiving chambers 3 in the housing 2.

Therefore, the molten resin, poured through the central gate 49*c*, flows through the mold cavity portion of the movable metal-mold 42 for molding the relatively-wide protective rib 10, and then flows into the relatively-narrow mold cavity portions for molding the partition walls forming the terminal receiving chambers 3 in the housing 2. Therefore, the molten resin positively flows even into the narrow mold cavity portions, and the yield of the molded housings is enhanced, and the productivity is enhanced, and the cost is reduced.

Figure 8:
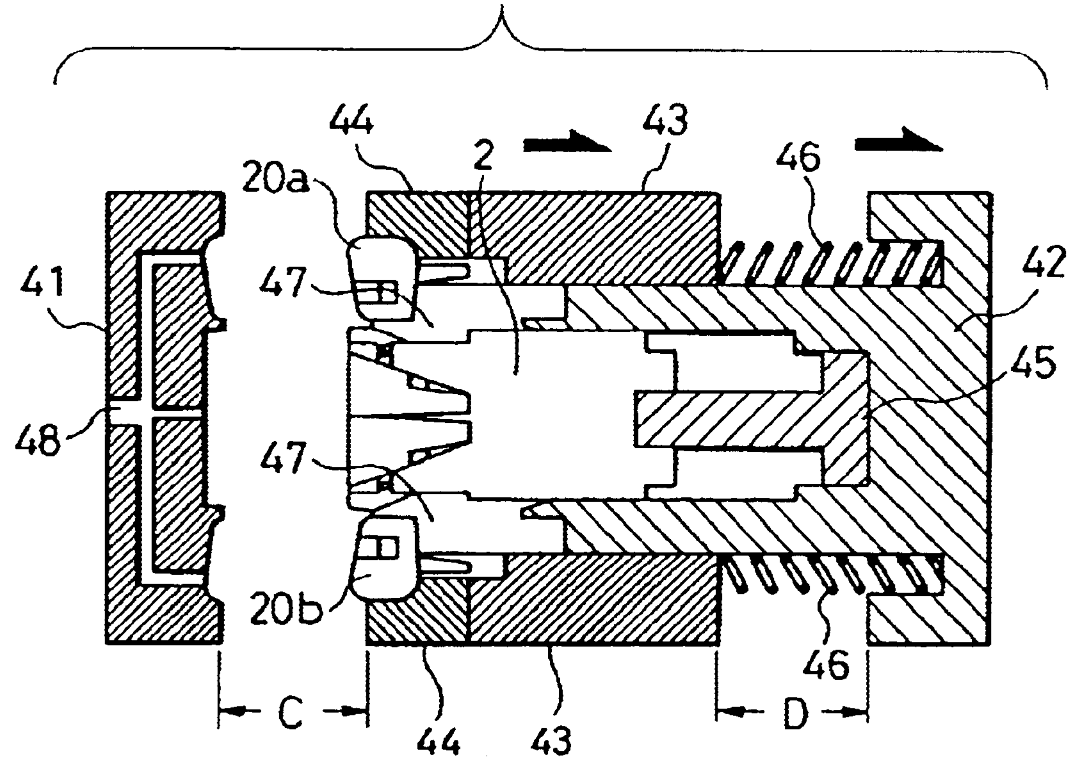
FIG. 8 is a vertical cross-sectional view showing the provisionally-retaining metal-mold assembly of FIG. 7 in its open condition.

Then, the movable metal-molds 42 to 45 is moved a distance C away from the fixed metal-mold 41, and at the same time the fourth movable metal-mold 45 is moved back to a position where this metal-mold 45 holds the rear end portion of the molded housing 2, that is, the first movable metal-mold 42 is moved back a distance D under the influence of the compression springs 46, as shown in FIG. 8. As a result, spaces 47 are formed inwardly of the third movable metal-molds 44, respectively, and the third movable metal-molds 44 are moved inwardly.

Figure 9:
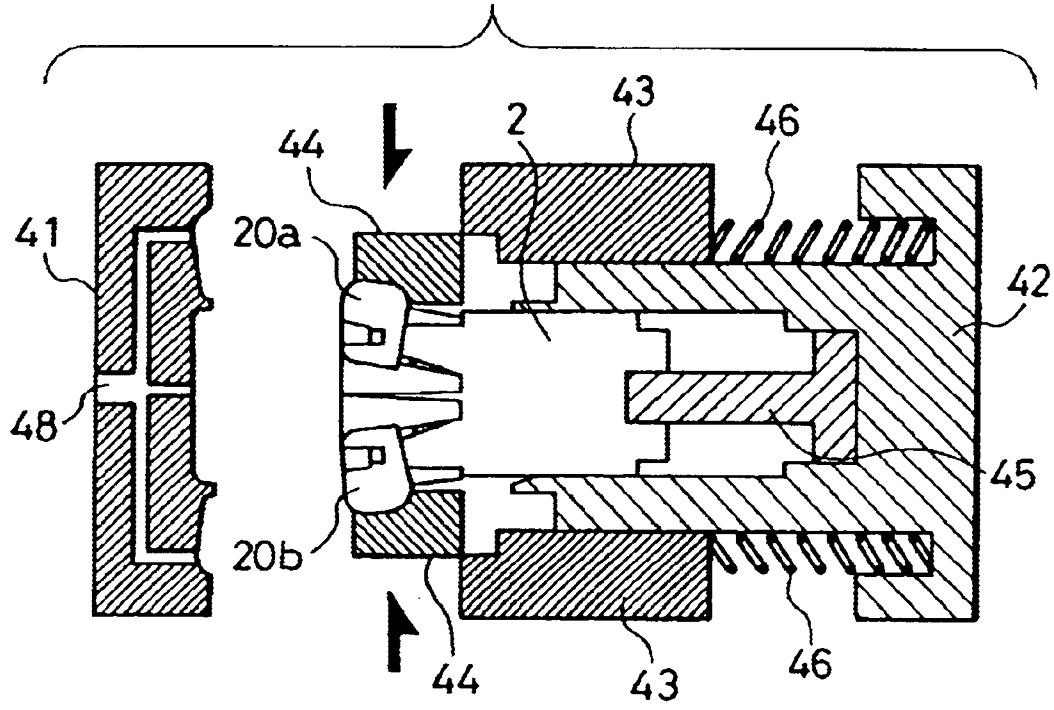
FIG. 9 is a vertical cross-sectional view of the provisionally-retaining metal-mold assembly of FIG. 8, showing a condition in which the rear holders are provisionally retained on the housing.
Figure 10:
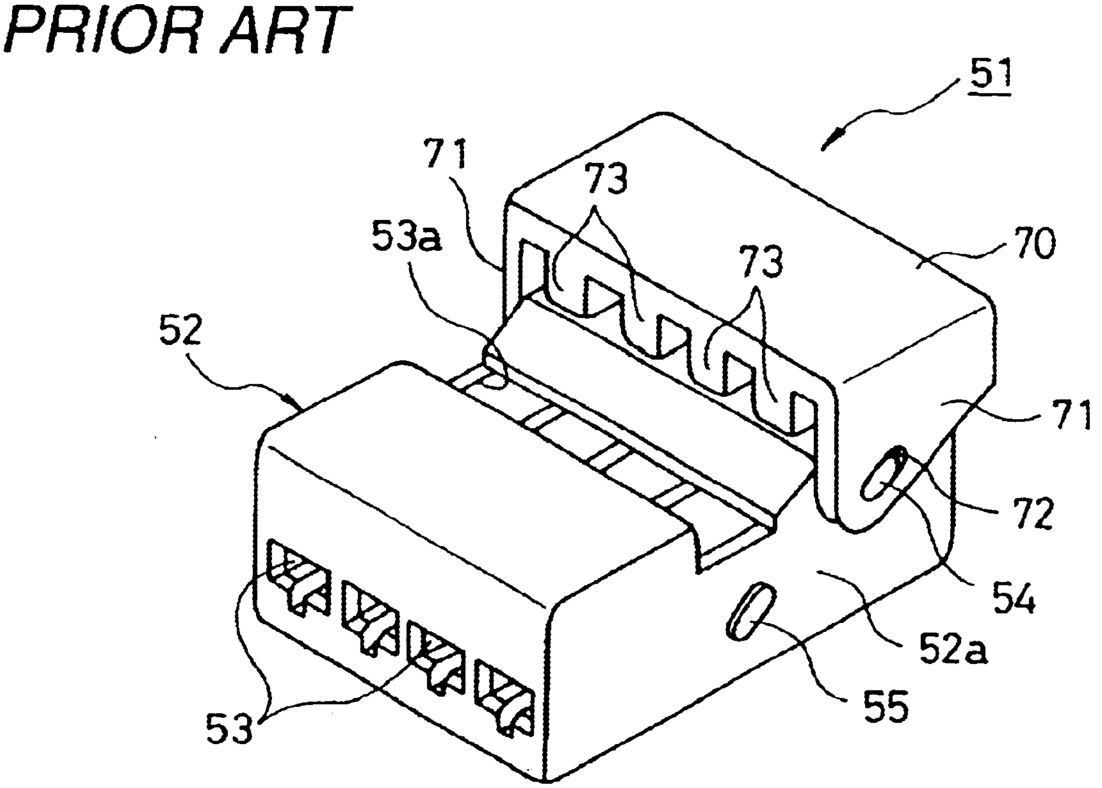
FIG. 10 PRIOR ART
FIG. 10 is a perspective view showing a conventional rear holder-attached connector.
Figure 11:
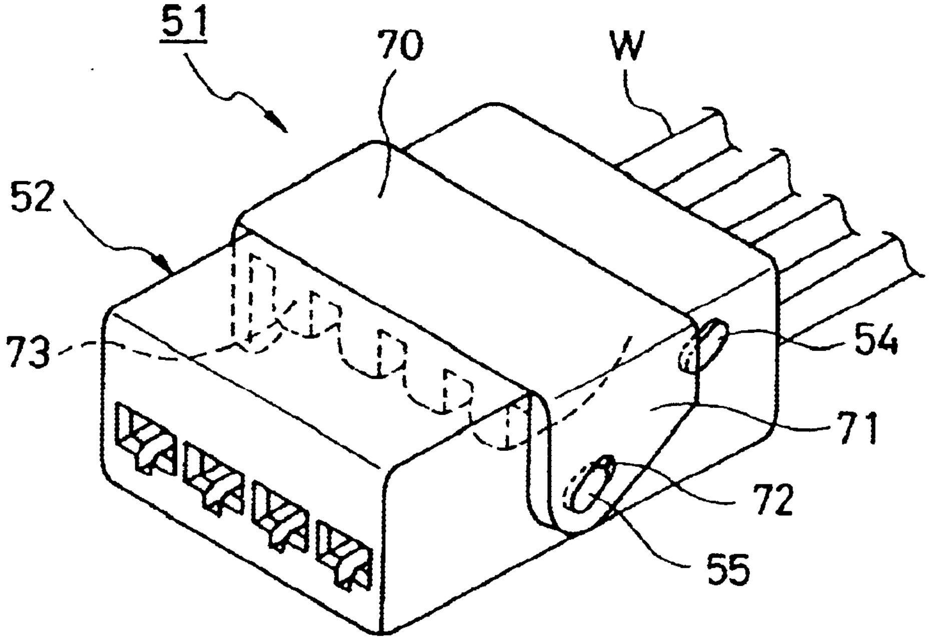
FIG. 11 PRIOR ART
FIG. 11 is a perspective view of the connector of FIG. 10, having a rear holder held thereon in a provisionally-retained condition.
Figure 12:
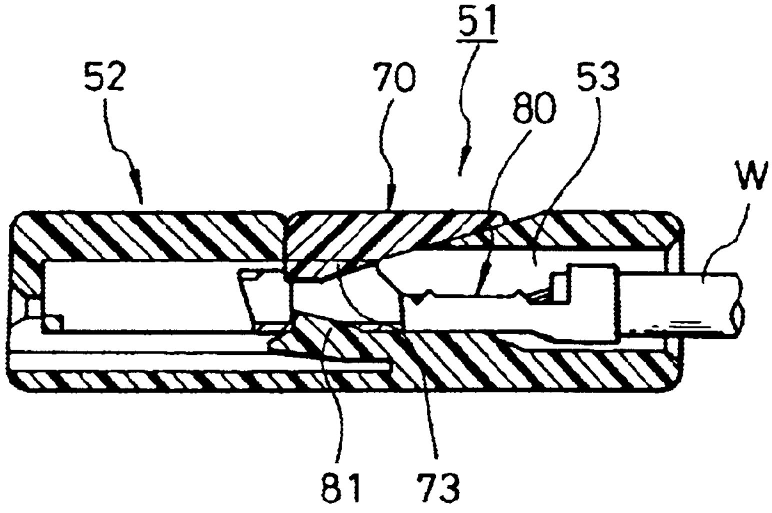
FIG. 12 PRIOR ART
FIG. 12 is a vertical cross-sectional view of the connector of FIG. 11.
Figure 13:
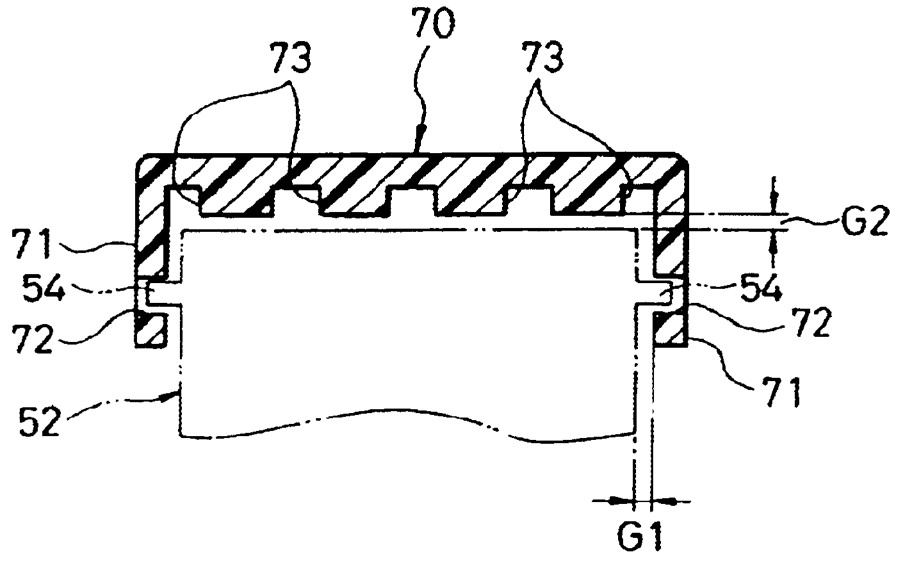
FIG. 13 PRIOR ART
FIG. 13 is a transverse cross-sectional view of the rear holder of FIG. 10.
Figure 14:
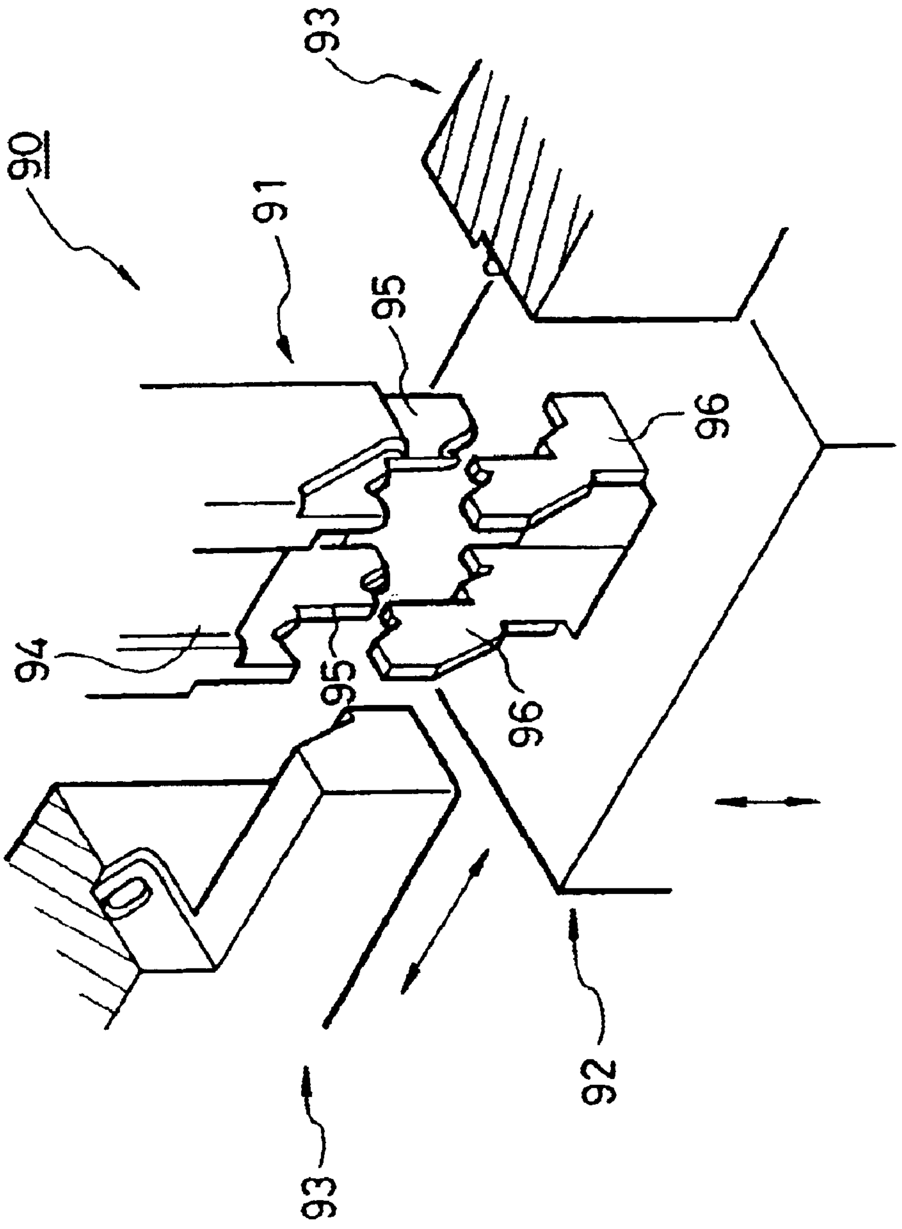
FIG. 14 PRIOR ART
FIG. 14 is a perspective view of a metal-mold assembly for molding the rear holder-attached connector of FIG. 10 and for provisionally retaining the rear holder on a housing.

Therefore, when the retaining holes 22 in each of the rear holders 20*a* and 20*b* are engaged with the provisionally-retaining projections 4, respectively, the rear holder 20*a* (20*b*) is pivotally moved or tilted forwardly about the provisionally-retaining projections 4, so that the retaining pawls 23 are engaged with the retaining steps 6, respectively, as shown in FIGS. 1 and 9. At this time, the inner surfaces of the rear holders 20*a* and 20*b* are abutted against the abutment surfaces 7, respectively, and therefore the rear holders 20*a* and 20*b* are held on the housing 2 in the provisionally-retained condition.

Then, the housing 2, having the rear holders 20*a* and 20 held thereon in the provisionally-retained condition, is discharged from the provisionally-retaining metal-mold assembly 40. The protective rib 10, having the width B larger than the width A of the rear holders 20*a* and 20*b*, is formed on the housing 2, and therefore even when the housing 2, thus discharged from the metal-mold assembly, is dropped, the rear holders 20*a* and 20*b* will not be disengaged from the housing 2.

As described above, the provisionally-retaining metal-mold assembly 40 comprises the fixed metal-mold 41, having the gates 49*a*, 49*b* and 49*c* branching off from the pouring gate 48, and the plurality of movable metal-molds 42 to 45 movable in the axial direction relative to the fixed metal-mold 41. When the fixed metal-mold 41 and the movable metal-molds 42 to 45 are combined together, the central gate 49*c* communicates with the mold cavity portion of the movable metal-mold 42 for molding the protective rib 10 projecting from the opposite side surfaces of the housing 2. This mold cavity portion communicates with the mold cavity portions for molding the partition walls forming the terminal receiving chambers 3 in the housing 2.

Therefore, the molten resin, poured through the central gate 49*c*, flows through the mold cavity portion of the movable metal-mold 42 for molding the relatively-wide protective rib 10, and then flows into the relatively-narrow mold cavity portions for molding the partition walls forming the terminal receiving chambers 3 in the housing 2. Therefore, the molten resin positively flows even into the narrow mold cavity portions, and the yield of the molded housings is enhanced.

The rear holder-attached connector of the present invention is not limited to the above embodiment, but suitable modifications can be made. For example, with respect to the direction of driving of the third movable metal-molds 44 of the provisionally-retaining metal-mold assembly 40, used for producing the rear holder-attached connector of this embodiment, these third movable metal-molds 44 need only to be driven in a direction perpendicular to the axis of the housing, and a system for driving these third movable metal-molds 44 in a horizontal direction can be used.

Although the rear holder-attached connector of the female type have been described above, the present invention can be applied to a rear holder-attached connector of the male type.

As described above, in the rear holder-attached connector of the present invention, the rear holder has the retaining hole, formed in the inner surface of each of the opposite side walls thereof, and also has the retaining pawl formed on this inner surface, the retaining pawl having the forwardly downwardly-slanting surface, and the provisionally-retaining projections for being engaged respectively in the retaining holes are formed respectively on the opposite side surfaces of the rear end portion of the housing, the tapering surfaces being formed on each of the provisionally-retaining projections over the entire periphery thereof, and the tapering retaining steps for being engaged respectively with the retaining pawls are formed on the housing, and are disposed in the vicinity of the provisionally-retaining projections, respectively, and the forwardly downwardly-slanting abutment surface for guiding the rear holder is formed on the upper surface of the housing at the rear end portion thereof, and the protective rib is formed on the housing, and projects outwardly from the opposite side surfaces of the housing, the width of the protective rib being larger than the width of the rear holder.

Therefore, the rear holder is held in the provisionally-retained position and the completely-retained position through the abutting engagement of the retaining pawls with the respective retaining steps and also through the abutting engagement of the inner surface (reverse surface) of the rear holder with the abutment surface. Thus, the movement of the rear holder for retaining purposes is effected through the relative wide surfaces, and therefore high dimensional accuracy is not required. Therefore, the productivity is enhanced, and the production cost is reduced.

And besides, since there is provided the protective rib which is larger in width than the rear holder, the rear holders, provisionally retained on the housing within the metal-mold assembly, will not be discharged from the metal-mold assembly to drop, and will not be disengaged from the housing even upon contact with another housing. Thus, there can be provided the rear holder-attached connector of high reliability.

The provisionally-retaining metal-mold assembly for molding the housing and the rear holders comprises the fixed metal-mold, having the plurality of gates branching off from the pouring gate, and the plurality of movable metal-molds movable relative to the fixed metal-mold, at least the central one among the plurality of gates being disposed substantially parallel to the terminal receiving chambers. The central gate communicates with the mold cavity portion of the movable metal-mold for molding the protective rib which is formed on the housing, and projects outwardly from the opposite side surfaces of the housing, the width of the protective rib being larger than the width of the rear holder.

Therefore, the molten resin, poured through the central gate, flows through the mold cavity portion of the movable metal-mold for molding the relatively-wide protective rib, and then flows into relatively-narrow mold cavity portions for molding the partition walls forming the terminal receiving chambers in the housing, and therefore, the molten resin positively flows even into the narrow mold cavity portions. Therefore, the yield of the molded housings is enhanced, and the productivity is enhanced, and the production cost is reduced.

What is claimed is:

1. A provisionally-retaining metal-mold assembly for molding a connector, said connector including a housing having a terminal receiving chamber into which a connection terminal is insertable, a rear holder attachable to the housing, the rear holder being operative to be held on the housing in one of a provisionally-retained condition and a completely-retained condition, wherein when the rear holder is provisionally retained on the housing, the connection terminal is insertable in the terminal receiving chamber, and when the rear holder is completely retained on the housing, the connection terminal is retained by the rear holder in the terminal receiving chamber, and a protective rib formed on the housing, the protective rib having portions outwardly projected from opposite side surfaces of the housing, wherein a distance between outer end surface of the portions of the protective rib is larger than a width of the rear holder, said metal mold assembly comprising:

a pouring gate communicating with a plurality of gates which branch off from the pouring gate, at least one central gate among said plurality of gates;

a fixed metal-mold comprising said plurality of gates; and a plurality of movable metal-molds movable relative to said fixed metal-mold, wherein said central gate communicates with a mold cavity portion, formed by at least one of the movable metal-molds, for molding the protective rib.

2. The provisionally-retaining metal-mold assembly recited in claim 1, wherein said plurality of gates further comprises at least another gate which communicates with a mold cavity portion for molding the rear holder.

3. The provisionally-retaining metal-mode assembly recited in claim 1, wherein the connector comprises two rear holders, and said plurality of gates further comprises a pair of second gates, disposed on opposing sides of said at least one central gate, which respectively communicate with separate mold cavity portions for molding the two rear holders.

4. The provisionally-retaining metal-mold assembly recited in claim 1, wherein said plurality of gates are aligned substantially parallel to the direction of movement of said plurality of movable metal molds.

5. The provisionally-retaining metal-mold assembly recited in claim 1, wherein said plurality of movable metal-molds comprises a first movable metal-mold arranged axially opposite said fixed metal-mold and shaped to form an outer side of the housing and an inner side of the rear holders.

6. The provisionally-retaining metal-mold assembly recited in claim 5, wherein said plurality of movable metal-molds further comprises a second movable metal-mold arranged axially between said first movable metal-mold and said fixed metal-mold, said second movable metal-mold supporting said first movable metal-mold in a manner to allow axial movement of said first movable metal-mold.

7. The provisionally-retaining metal-mold assembly recited in claim 6, wherein said second movable metal-mold is arranged laterally outside said first movable metal-mold.

8. The provisionally-retaining metal-mold assembly recited in claim 6, wherein said metal-mold assembly further comprises at least one compression spring arranged axially between said first movable metal-mold and said second movable metal-mold.

9. The provisionally-retaining metal-mold assembly recited in claim 8, wherein said at least one compression spring moves said first movable metal-mold away from said second movable metal-mold to allow provisional attachment of the rear holder to the housing.

10. The provisionally-retaining metal-mold assembly recited in claim 5, wherein said plurality of movable metal-molds comprises a third movable metal-mold arranged axially between said second movable metal-mold and said fixed metal-mold and shaped to form an outer side of the rear holder.

11. The provisionally-retaining metal-mold assembly recited in claim 10, wherein the third movable metal-mold is laterally inwardly movable to provisionally attach the rear holder to the housing.

12. The provisionally-retaining metal mold assembly recited in claim 10, wherein said plurality of movable metal-molds comprises a fourth movable metal-mold arranged axially between said first movable metal-mold and said fixed metal-mold and shaped to form a central portion of the housing and to support the housing.

13. The provisionally-retaining metal-mold assembly recited in claim 12, wherein said fourth movable metal-mold is arranged laterally inside said first, second and third movable metal-molds.

14. The provisionally-retaining metal-mold assembly recited in claim 1, wherein said plurality of movable metal-molds further comprises a second movable metal-mold arranged axially opposite to said fixed metal-mold, said second movable metal-mold supporting another one of said plurality of movable metal-molds in a manner to allow axial movement of said another one of said plurality of movable metal-molds.

15. The provisionally-retaining metal-mold assembly recited in claim 1, wherein said plurality of movable metal-molds comprises a third movable metal-mold arranged axially opposite to said fixed metal-mold, said third movable metal-mold shaped to form an outer side of the rear holder.

16. The provisionally-retaining metal-mold assembly recited in claim 1, wherein said plurality of movable metal-molds comprises a fourth movable metal-mold arranged axially opposite to said fixed metal-mold and shaped to form a central portion of the housing and to support the housing.

17. The provisionally-retaining metal-mold assembly recited in claim 13, wherein, when said metal-mold assembly is closed, said first movable metal-mold contacts said fixed metal-mold.

18. The provisionally-retaining metal-mold assembly recited in claim 14, wherein, when said metal-mold assembly is closed, said second movable metal-mold is axially separated from said fixed metal-mold by another of said plurality of movable metal-molds.

19. The provisionally-retaining metal-mold assembly recited in claim 15, wherein, when said metal-mold assembly is closed, said third movable metal-mold contacts said fixed metal-mold.

20. The provisionally-retaining metal-mold assembly recited in claim 16, wherein, when said metal-mold assembly is closed, said fourth movable metal-mold is axially separated from said fixed metal-mold and a portion of the connector is formed between.

* * * * *